(12) United States Patent
Lutian et al.

(10) Patent No.: US 8,330,804 B2
(45) Date of Patent: Dec. 11, 2012

(54) SCANNED-BEAM DEPTH MAPPING TO 2D IMAGE

(75) Inventors: John Lutian, Bellevue, WA (US); Steven Bathiche, Kirkland, WA (US); Dawson Yee, Medina, WA (US); John Robert Lewis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 12/778,864

(22) Filed: May 12, 2010

(65) Prior Publication Data

US 2011/0279648 A1    Nov. 17, 2011

(51) Int. Cl.
*H04N 15/00*    (2006.01)
*G06T 15/00*    (2011.01)

(52) U.S. Cl. .......................................... 348/46; 345/419

(58) Field of Classification Search ............. 348/42, 348/43, 46, 31, 37, 67, 68, 49; 356/4.01, 356/3.06, 141.2, 609; 345/467, 474, 441, 345/419

See application file for complete search history.

(56) References Cited

U.S. PATENT DOCUMENTS

| | | | |
|---|---|---|---|
| 6,052,100 | A | 4/2000 | Soltan et al. |
| 6,765,606 | B1 | 7/2004 | Iddan et al. |
| 7,362,449 | B2 | 4/2008 | Dubois et al. |
| 2007/0046948 | A1 | 3/2007 | Podoleanu et al. |
| 2008/0212838 | A1 | 9/2008 | Frigerio |

OTHER PUBLICATIONS

Anh, et al., "Virtual Gesture Screen System Based on 3D Visual Information and Multi-layer Perceptron", Retrieved at http://66.102. 9.132/search?q=cache%3A836KQUhxJPcJ%3Awww.waset. org%2Fjournals%2Fwaset%2Fv59%2Fv59-75.pdf+depth+ sensing+%2B+laser+ranging+%22time+of+flight%22+3D+ image+gesture&hl=en >>, World Academy of Science, Engineering and Technology, 2009, pp. 6.

Upendranath, Vanam., "Smart CMOS Image Sensor for 3d Measurement", Retrieved at <<http://eprints.biblio.unitn.it/archive/00000760/01/jan12ICT.pdf >>, DIT-05-021, Feb. 2005, pp. 107.

Kolb, et al., "ToF-Sensors: New Dimensions for Realism and Interactivity", Retrieved at <<http://www.cg.informatik.uni-siegen.de/data/Publications/2008/kolb08survey.pdf >>, IEEE Computer Society Conference on Computer Vision and Pattern Recognition Workshops, CVPRW '08, Jun. 23-28, 2008, pp. 6.

*Primary Examiner* — Behrooz Senfi

(74) *Attorney, Agent, or Firm* — Alleman Hall McCoy Russell & Tuttle LLP

(57) ABSTRACT

A method for constructing a 3D representation of a subject comprises capturing, with a camera, a 2D image of the subject. The method further comprises scanning a modulated illumination beam over the subject to illuminate, one at a time, a plurality of target regions of the subject, and measuring a modulation aspect of light from the illumination beam reflected from each of the target regions. A moving-mirror beam scanner is used to scan the illumination beam, and a photodetector is used to measure the modulation aspect. The method further comprises computing a depth aspect based on the modulation aspect measured for each of the target regions, and associating the depth aspect with a corresponding pixel of the 2D image.

20 Claims, 4 Drawing Sheets

SCANNED-BEAM DEPTH MAPPING TO 2D IMAGE

BACKGROUND

In various applications, some form of depth mapping is used to construct a three-dimensional (3D) model of a subject or an environment. Such applications range from aircraft navigation to robotics to video gaming, for example. In some depth mapping approaches, interrogating the subject or environment at an acceptably high two-dimensional (2D) map resolution and an acceptably high frame rate may pose a challenge. Other challenges include providing fine, invariant depth resolution through shallow depth ranges, and combining depth mapping with low-cost 2D imaging technology.

SUMMARY

Accordingly, one embodiment of this disclosure provides a method for constructing a 3D representation of a subject, the representation including brightness as well as depth information. This method comprises capturing, with a camera, a 2D image of the subject, the 2D image including an array of pixels and at least one brightness value for each pixel. The method further comprises scanning a modulated illumination beam over the subject to illuminate, one at a time, a plurality of target regions of the subject, and measuring a modulation aspect of light from the illumination beam reflected from each of the target regions. As disclosed herein, a moving-mirror beam scanner is used to scan the illumination beam, and a photodetector is used to measure the modulation aspect. The method further comprises computing a depth aspect based on the modulation aspect measured for each of the target regions, and associating the depth aspect with a corresponding pixel of the 2D image.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

Figure 1:
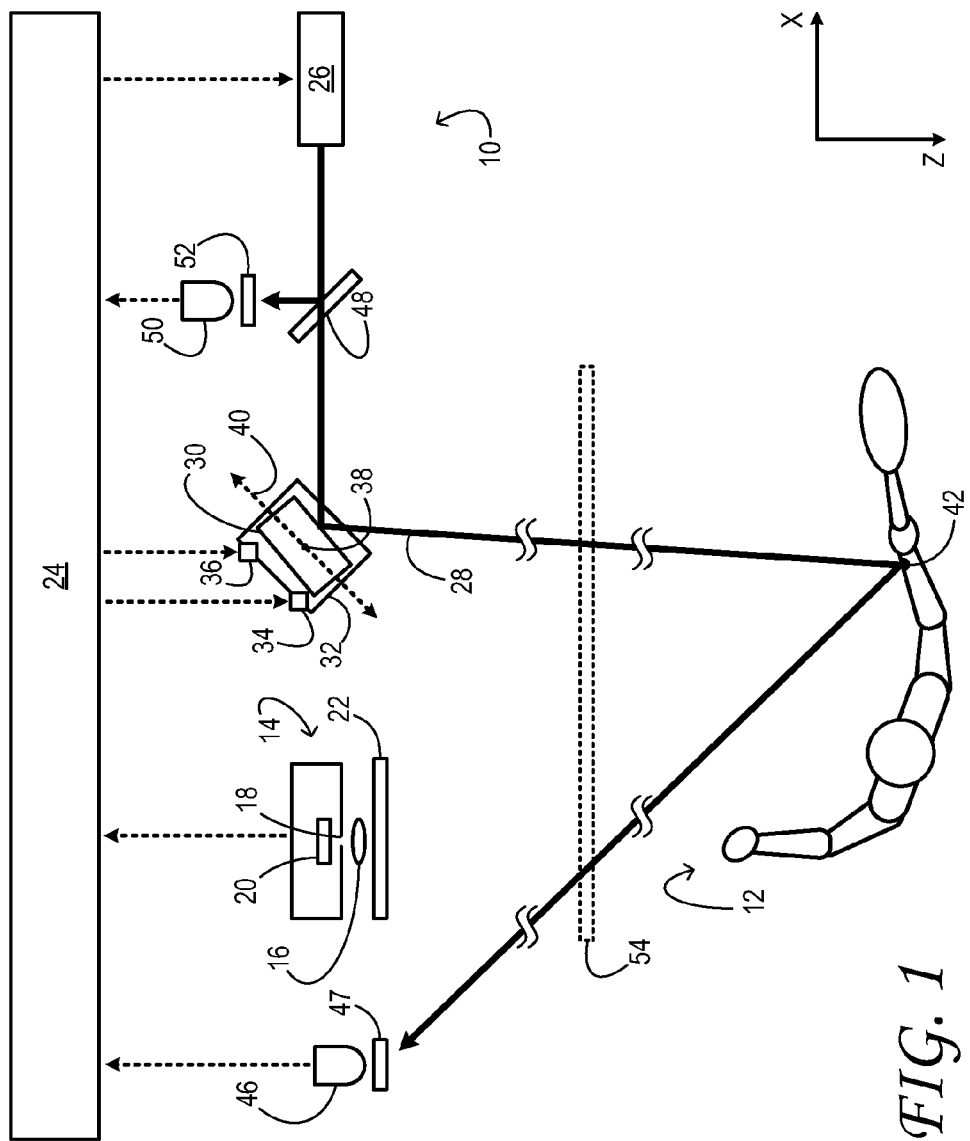
FIG. 1 schematically shows a plan view of a 3d modeler in accordance with an embodiment of this disclosure.

The subject matter of this disclosure is now described by way of example and with reference to certain illustrated embodiments. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows a plan view of 3D modeler 10 in one embodiment. The 3D modeler is arranged opposite subject 12 and is configured to construct a 3D representation of a subject—i.e., to encode a 3D model of the subject, which includes both brightness and depth information.

3D modeler 10 includes camera 14—a digital camera configured to capture a 2D image of subject 12, and to encode the image as an array of pixels, each pixel having at least one variable brightness and/or color value. The term 'pixel' as used herein conforms to common usage in the art of digital imaging; the pixels of an image may be arranged, accordingly, in a rectangular array spanning Cartesian axes X and Y. In the embodiment shown in FIG. 1, the camera includes lens 16, aperture 18, and photodetector array 20. The lens focuses light from the subject through the aperture and onto the photodetector array, where it forms a 2D image. The photodetector array may be a CMOS, CCD, and/or photodiode array, for example. In one embodiment, the photodetector array may include various color-sensitive photodetector elements. Accordingly, camera 14 may be a color camera, and the 2D image may be a color image having two, three, or more color-specific brightness values for each pixel. Further, the wavelength sensitivity of the camera may extend into the infrared or the near infrared.

In one embodiment, camera 14 may be configured for standard SVGA resolution—viz., it may form a 2D image having 800 or more pixels along a first axis and 600 or more pixels along a second axis orthogonal to the first axis. In other embodiments, the camera may be configured for a higher or lower resolution—e.g. 640×480 VGA resolution. In one embodiment, the camera may be configured to capture not only a static 2D image of the subject, but a series of 2D images in rapid succession. Accordingly, the camera may be a video camera, which captures the images at a frame rate suitable for video applications—at thirty to sixty frames per second, for example.

In the embodiment shown in FIG. 1, filter 22 covers aperture 18, so only the light transmitted through the filter reaches photodetector array 20. Other embodiments may include a series of filters so arranged—polarizing, interference, and/or color filters, for example. In this manner, camera 14 may be configured to image light of one or more predetermined polarization-state or wavelength ranges.

In the embodiment shown in FIG. 1, camera 14 is operatively coupled to controller 24. The controller is configured to command and control 2D image capture by the camera, and to receive the captured 2D image. Controller 24 may also control other functions of 3D modeler 10 or of the system in which the 3D modeler is installed. For example, the controller may include a game playing device configured to execute a video-game application. Accordingly, the 3D representation of subject 12, which the 3D modeler constructs, may encode input data for the video-game application. In one embodiment, the subject may be a user (i.e., player) of the video-game application. The 3D representation may encode the subject's arm motions, hand gestures, and/or posture, for example. In such applications, a suitable depth-sensing range may be on the order of 1 to 5 meters, which is consistent with the example configurations presently disclosed. It will be noted, however, that this disclosure is in no way limited to video-gaming applications, and that other applications and depth-sensing ranges are equally envisaged.

In the embodiments considered here, the 2D image captured by camera 14 may fail to particularly encode the contour of subject 12 in the Z direction, orthogonal to axes X and Y. Therefore, 3D modeler 10 includes additional componentry configured to associate a depth aspect to each pixel of the captured 2D image. To this end, the 3D modeler is configured to project temporally modulated light onto the subject and to detect the temporally modulated light reflected back from the subject. The lag or delay in the modulation of the reflected light with respect to the projected light can be related to the distance out to the region of the subject where the modulated light is projected. Further, by projecting the modulated light onto a very small target region of the subject, and by scanning that target region over the entire subject, the 3D modeler may be configured to map the contour of the subject in the Z direction. To enable such functionality, the 3D modeler includes a moving-mirror beam scanner, as further described below. In this approach, depth is sensed at a substantially invariant resolution, in contrast to other methods where depth resolution decreases with increasing depth.

Continuing now in FIG. 1, 3D modeler 10 includes laser 26 arranged to direct its emission into a low-divergence illumination beam 28. In one embodiment, the laser may be a diode laser configured to emit infrared light. As shown in FIG. 1, the laser is operatively coupled to controller 24; accordingly, the controller may be configured to modulate the intensity of the illumination beam by controlling the current or voltage applied to the laser, or in any other suitable manner. The 3D modeler also includes mirror 30, mechanically coupled to mount 32. The mirror may comprise any suitable specular reflector. In one embodiment, the mirror may be substantially circular, having a diameter of 0.1 to 10 mm. In other embodiments, two or more mirrors may be used cooperatively, and such mirrors may be circular, elliptical, and/or another suitable shape. The mount may be any elastic mounting that supports the mirror and allows the mirror to be deflected about two, distinct rotational axes. The mount may be a flexural mount, for example. In one embodiment, the mirror and mount may embody a resonant mechanical system. For instance, the mirror-mount system may exhibit a resonance quality factor of hundreds.

FIG. 1 shows first transducer 34 and second transducer 36, operatively coupled to controller 24. The first and second transducers are configured to deflect the mirror about first rotational axis 38 (oriented normal to the plane of the drawing) and second rotational axis 40, respectively. The first and second rotational axes are not parallel to each other, and in some embodiments may be orthogonal, as shown in FIG. 1. In the embodiments illustrated herein, a single mirror situated on a dual-axis mount is deflected about orthogonal rotational axes. In other embodiments, the same effect can be achieved using two mirrors arranged in series, each mirror situated on a single-axis mount.

In the embodiments contemplated herein, first transducer 34 and second transducer 36 may include piezoelectric, electromagnetic, or electrostatic transducers, for example. Controller 24 is configured to apply a drive signal to each of the transducers—i.e., to vary a driving voltage or current to the transducers—and thereby influence the deflection of mirror 30. In one particular embodiment, transducers 34 and 36 are electrostatic transducers that impart a deflective force to the mirror when a high voltage is applied across closely-spaced plates or combs. Lacking ferromagnetic or piezoelectric materials, electrostatic transducers can be manufactured using standard microelectromechanical systems (MEMS) processing and are available at relatively low-cost.

As shown in FIG. 1, illumination beam 28 is reflected off mirror 30 en route to subject 12. Accordingly, controlling the deflection of the mirror about first rotational axis 38 and second rotational axis 40 allows the illumination beam to be steered over the subject to illuminate a target region 42 of the subject, background or foreground. More precisely, controlling the deflection of the mirror about the first rotational axis determines the position of the illuminated target region along the X axis, and controlling the deflection of the mirror about the second rotational axis determines the position of the illuminated target region along the Y axis.

In the manner described above, transducers 34 and 36 may be driven to deflect mirror 30 so that the illumination beam 28 scans over subject 12. To map the contour of the subject, controller 24 is configured to address various pixels of the 2D image in synchronicity with the drive signals applied to transducers 34 and 36, while the illumination beam is scanning over the subject. Addressing a pixel of the 2D image comprises associating a computed depth aspect with that pixel, as further described below.

Figure 2:
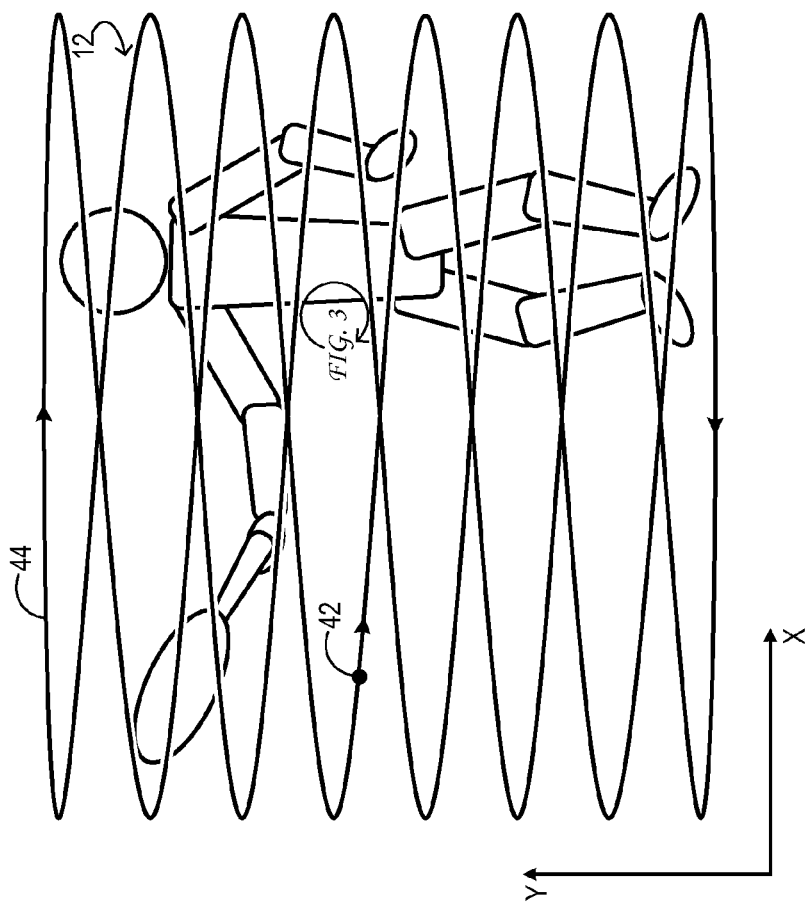
FIG. 2 schematically shows a view of a subject being scanned by an illumination beam in accordance with an embodiment of this disclosure.

In one embodiment, transducers 34 and 36 may be driven by pulses at pulse-train frequencies approaching resonance frequencies of the mirror-mount system. Accordingly, illumination beam 28 may scan the subject at a periodically changing velocity along a Lissajous figure—viz., $$X(t)=a_X*\sin(2*\pi*f_X*t+\phi_X), \tag{1}$$

$$Y(t)=a_Y*\sin(2*\pi*f_Y*t+\phi_Y), \tag{2}$$

where X(t) and Y(t) define the coordinates of illuminated target region 42 in terms of scan amplitude factors $a_X$ and $a_Y$, scan frequencies $f_X$ and $f_Y$, phase terms $\phi_X$ and $\phi_Y$, and the time t. To illustrate some features of the scan, FIG. 2 shows illuminated target region 42 tracing out Lissajous FIG. 44 over subject 12. FIG. 2 shows the subject rotated with respect to the view of FIG. 1 and oriented as it would appear in the captured 2D image. Naturally, the illuminated target region may trace out a much higher-order Lissajous figure for suitably high resolution.

Figure 3:
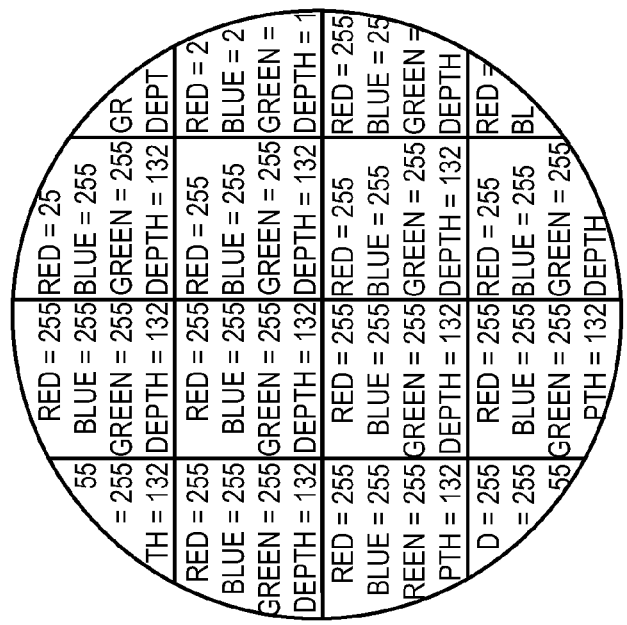
FIG. 3 schematically shows a section from FIG. 2, detailing an example pixel structure of a 2D image with an associated depth aspect, in accordance with an embodiment of this disclosure.

FIG. 3 schematically shows a section from FIG. 2, detailing an example pixel structure of the 2D image with an associated depth aspect. In particular, each pixel of the 2D image is shown having a red-color brightness aspect, a green-color brightness aspect, a blue-color brightness aspect, and also a depth aspect.

Returning now to FIG. 1, 3D modeler 10 includes subjective photodetector 46 arranged opposite subject 12 and configured to receive light from illumination beam 28 reflected off the subject. The subjective photodetector may comprise a photodiode or photomultiplier and may be unlensed to detect light over a broad range of angles. In another embodiment, wide angle reflective or refractive optics can be used to collect the reflected light from the illumination beam and direct it onto the detector. In still other embodiments, one or more light guides operating via total internal reflection may be used for this purpose. In the embodiment shown in FIG. 1, light is transmitted to the subjective photodetector through filter 47, which may be an interference or color filter, for example. Configured to detect narrow-band light from the illumination beam, the subjective photodetector is made less sensitive to interferences caused by ambient light. In one embodiment, the filter may be configured to transmit light of a wavelength or polarization-state range emitted by the laser and to block light of a wavelength or polarization-state range not emitted by the laser.

The 3D modeler also includes pick-off plate 48 and reference photodetector 50. The reference photodetector is arranged to receive a small portion of light from illumination beam 28. The pick-off plate reflects that small portion toward the reference photodetector, while transmitting much of the light toward mirror 30. In one embodiment, the reference photodetector may be substantially the same as the subjective photodetector and may receive light through filter 52—substantially the same as filter 47.

As shown in FIG. 1, subjective photodetector 46 and reference photodetector 50 are both operatively coupled to controller 24. By receiving and processing the output from both photodetectors, the controller may be configured to measure a modulation lag or delay in the light reflected off subject 12 relative to the light reflected off pick-off plate 48. By inference, this lag or delay will be directly related to the optical path length from the pick-off plate to the illuminated target region 42 of the subject. When the illumination beam scans over a close-up region of the subject, the controller will measure a relatively short modulation lag or delay; when the beam scans over a far-away region of the subject, the controller will measure a longer modulation lag or delay. Accordingly, the controller may be configured to compute a depth aspect for the illuminated target region based on the measured lag or delay. In other embodiments, the 3D modeler may include additional photodetectors and may average or otherwise combine the signals from the various photodetectors in any suitable way to compute the depth aspect.

In some embodiments, the accuracy of 3D modeler 10 may be improved via calibration. Therefore, as shown in FIG. 1, calibration subject 54 may be arranged opposite 3D modeler 10 during calibration of the 3D modeler. In one embodiment, the calibration subject may comprise a diffusively reflective screen oriented vertically—viz., parallel to the X, Y plane. The calibration subject may be arranged at a predetermined or known distance (e.g., 1 meter) from the 3D modeler during calibration. As further described hereinafter, the calibration subject may be used for at least two different modes of calibration: a first mode for mapping each computed depth aspect to the corresponding pixel of the captured 2D image, and a second mode for refining the computed depth aspect. Note that the mapping between X,Y of the camera and X',Y' of the scan pattern will depend on Z determined by the scanned beam unless the 2D camera and scanner are optically aligned. This is due to parallax. For each value of Z there is a direct mapping between X,Y and X',Y'.

In another embodiment, a plurality of calibration elements arranged at different depth locations may be used in place of, or in addition to, calibration subject 54. These calibration elements may provide a large brightness contrast relative to the background. For example, white and/or gray calibration elements may be used with a black background. In this manner the calibration elements imaged by the camera may be readily correlated with corresponding modulation aspects detected via the photodector and scanned-beam system. The 2D (X, Y) spatial locations of the calibration elements are, thus, readily identifiable in the images from the camera. The depth of these calibration elements in an otherwise bare scene allow a definitive depth aspect (Z) to be established for each of the objects. Accordingly, data representing the configuration of the calibration elements may be correlated with the imaged scene geometry in a suitable calibration procedure.

Hence, the example configurations described above enable various methods for encoding a 3D model of a subject. Some such methods are now described, by way of example, with continued reference to above configurations. It will be understood, however, that the methods here described, and others fully within the scope of this disclosure, may be enabled via other configurations as well.

Figure 4:
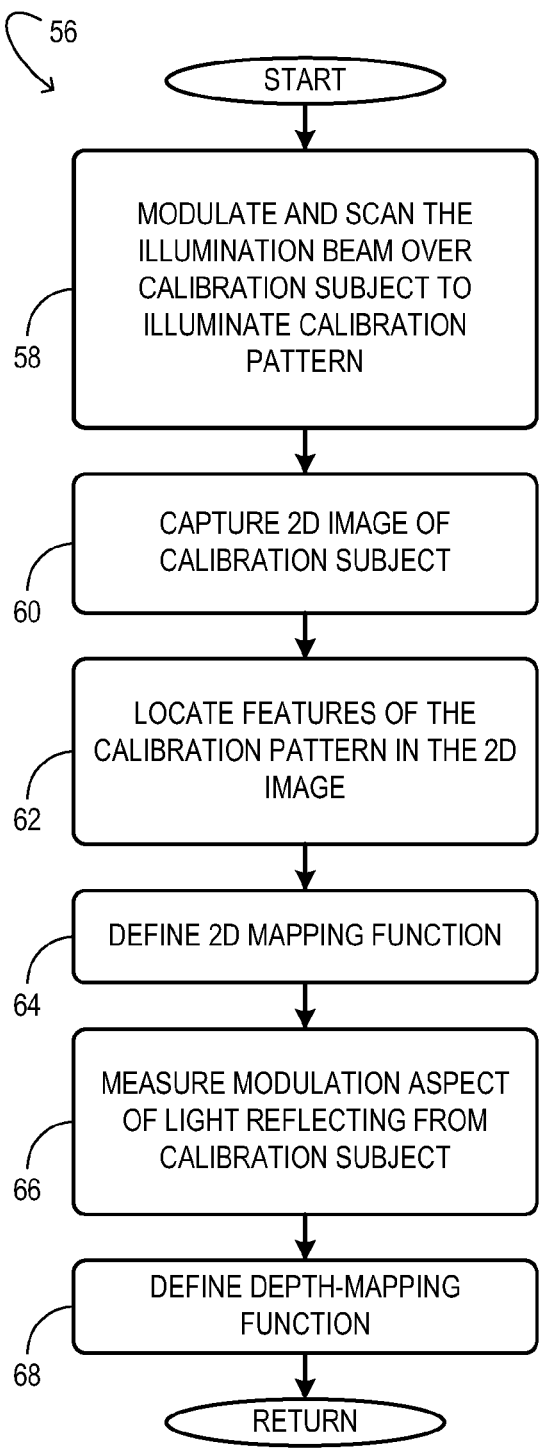
FIG. 4 illustrates an example method for calibrating a 3D modeler in accordance with an embodiment of this disclosure.

FIG. 4 illustrates an example method 56 for calibrating a 3D modeler in accordance with this disclosure. The method makes use of a calibration subject, as described above. At 58, an illumination beam is modulated and scanned over the calibration subject to illuminate a calibration pattern on the calibration subject. During calibration, the illumination beam may be pulse modulated at a frequency derived from $f_x$ and/or $f_y$ by integer division. The calibration pattern so obtained may include a series of lines or dots. At 60, a 2D image of the calibration subject under such patterned illumination is captured. The image may be captured by a camera of the 3D modeler—camera 14, for example. At 62, one or more features of the calibration pattern (e.g., the lines or dots) are located in the 2D image to define a 2D mapping function. In other words, the X and/or Y coordinates of the features are determined. Based on these coordinates, at 64, a 2D mapping function is defined for mapping each target region under the illumination beam to a pixel of the 2D image. In one embodiment, the 2D mapping function may be as described in eqs 1 and 2 above, with the amplitude factors and phase terms defined so that X(t) and Y(t) coincide with the X and Y coordinates here determined. In embodiments where coordinates of a plurality of features of the calibration pattern are located, global least-squares fitting may be used to arrive at an optimal set of amplitude factors and phase terms for use in the 2D mapping function.

Continuing in FIG. 4, at 66, a modulation aspect of light reflecting from the calibration subject is measured in order to define a depth-mapping function. The particular modulation aspect measured will differ in the various embodiments of this disclosure. Some example modulation aspects such as phase delay and pulse delay are described below in connection to FIG. 5. Regardless of the particular modulation aspect measured, at 68 of method 56, a depth mapping function is defined for transforming each measured modulation aspect to a corresponding depth aspect. To define the depth mapping function, an adjustable parameter relating the measured modulation aspect to the depth aspect may be set or adjusted so that the depth aspect measured during calibration corresponds to a predetermined or known distance between 3D modeler 10 and calibration subject 54. After 68, the method returns.

Figure 5:
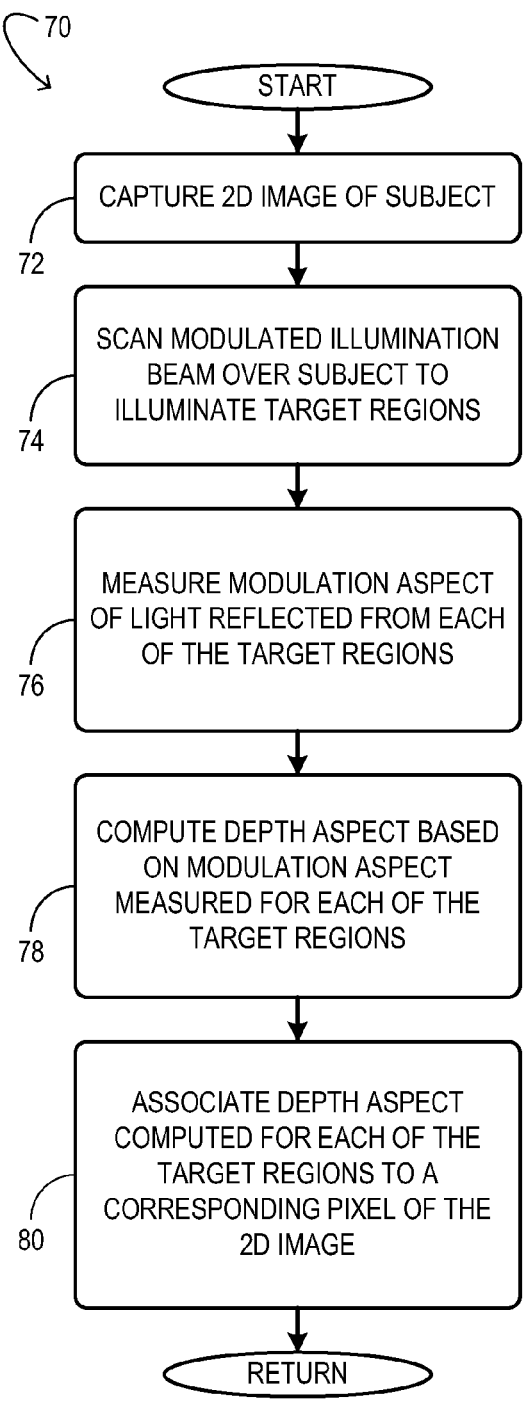
FIG. 5 illustrates an example method for constructing a 3D representation of a subject in accordance with an embodiment of this disclosure.

FIG. 5 illustrates an example method 70 for constructing a 3D representation of a subject in one embodiment. At 72, a 2D image of the subject is captured. The 2D image may be captured by a camera of the 3D modeler, substantially as described above. At 74, a modulated illumination beam is scanned over the subject to illuminate, one at a time, a plurality of target regions of the subject. A moving-mirror beam scanner may be used to scan the illumination beam over the subject, substantially as described above. In the different embodiments of this disclosure, the illumination beam may be modulated differently. In one embodiment, the illumination beam may be pulse-modulated—i.e., modulated to a train of relatively narrow pulses with a duty cycle less than fifty percent. For example, the pulse train may comprise 2 nanosecond pulses at a frequency of 200 MHz. In other embodiments, the illumination beam may be wave-modulated to any periodic function whatsoever. In one such embodiment, the illumination beam may be modulated to a sine wave; a sine-wave modulation of 30 MHz may be used in one example.

At 76, a modulation aspect of the light reflected from each of the target regions is measured using one or more photodetectors. As noted above, different modulation aspects may be measured in the different embodiments of this disclosure.

In one embodiment, where the illumination beam is pulse-modulated, a pulse delay (i.e., a relative pulse timing) may be measured at 76 and used to compute the depth aspect. For example, if reference photodetector 50 detects a modulation pulse at time $t_R$, and subjective photodetector 46 detects the same modulation pulse at time $t_S$, the length L of the optical path from pick-off plate 48 to illuminated target region 42 and back to subjective photodetector 46 will be given by $$L=(t_S-t_R)/c, \qquad (3)$$

where c is the speed of light in air. Thus, by concurrent monitoring of both photodetector outputs and by evaluating the delay $t_S-t_R$, the value of L can be determined.

In another embodiment, where the illumination beam is wave-modulated, a phase delay (i.e., a relative modulation phase) may be measured at 76 and used to compute the depth aspect. For example, if the intensity of the illumination beam is modulated sinusoidally, then the output of reference photodetector 50 will be $$P_R*\sin(\omega*t), \qquad (4)$$

but the output of subjective photodetector 46 will be $$P_S*\sin(\Omega*t+\Omega*L/c), \qquad (5)$$

where $P_R$ and $P_S$ are constants, and $\omega$ is the angular frequency of the modulation. Thus, by concurrent monitoring of the photodetector outputs and by applying suitable phase-detection methods, the value of L can be determined.

At 78, a depth aspect is computed for each of the target regions based on the modulation aspect measured. In embodiments where mirror 30 is much closer to pick-off plate 48 than to subject 12, $$L\approx 2*\mathrm{sqrt}((\Delta X)^2+(\Delta Y)^2+(\Delta Z)^2), \qquad (6)$$

where $\Delta X$, $\Delta Y$, and $\Delta Z$ are the distances from mirror 30 to illuminated target region 42 along the X, Y, and Z axes, respectively. Via eqs 1 and 2, $\Delta X$ and $\Delta Y$ can be determined for the illuminated target region being scanned. Accordingly, the depth aspect $\Delta Z$ may readily be computed for that target region. At 80, the depth aspect computed for each of the target regions is associated with a corresponding pixel of the 2D image. In one embodiment, a 2D mapping function may be used for this purpose—the 2D mapping function defined, for example at 64 of the previous method. Accordingly, associating the depth aspect with a corresponding pixel of the 2D image may comprise mapping the plurality of target regions to the corresponding plurality of pixels of the 2D image.

In one further embodiment, a depth mapping function determined via calibration—at 68 of method 56, for example—may be used to refine the depth aspect computed according to method 70. Nonidealities of the controller circuitry may give rise to unequal response times for the reference and subjective photodetectors, which could result in systematic error in the computed pulse delay or phase delay. The depth mapping function may be used, therefore, to transform the measured pulse delay or phase delay from an apparent to a refined value, despite such nonidealities.

In the embodiments envisaged herein, the modulation aspect is measured periodically as the illumination beam scans over the subject, thereby defining a depth-sampling resolution along the X axis, and a depth-sampling resolution along the Y axis. In other words, while illumination beam 28 is being scanned over the subject, the position of illuminated target region 42 may be known to a given resolution along the X axis and to a given resolution along the Y axis. These resolutions may be limited by various factors, including the amplitude of deflection of mirror 30, the divergence of illumination beam 28, and the frequency of the clock pulses driving transducers 34 and 36, for example. In some embodiments, the depth-sampling resolution along one or both of the axes may be lower than the resolution of the 2D image along the same axis. In these embodiments, associating a depth aspect to each pixel of the captured 2D image may comprise associating the computed depth aspect with the pixel geometrically closest to the illuminated target region, in view of the 2D mapping function referenced above. Depth aspects may then be estimated by interpolation for pixels not geometrically closest to the target regions. Thus, a depth aspect may be interpolated for a pixel of the 2D image based on two or more depth aspects associated with other pixels of the image. Further, in embodiments where the captured 2D image is among a series of captured video frames of the same subject, depth aspects associated with corresponding pixels in the series of captured video frames may be averaged together to achieve better signal-to-noise in the computed depth aspect.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A method for constructing a 3D representation of a subject, the representation including brightness and depth information, the method comprising:
   with a camera, capturing a 2D image of the subject, the 2D image including an array of pixels and at least one brightness value for each pixel;
   with a moving-mirror beam scanner, scanning a modulated illumination beam over the subject to illuminate, one at a time, a plurality of target regions of the subject;
   with a photodetector, measuring a modulation aspect of light from the illumination beam reflected from each of the target regions;
   computing a depth aspect based on the modulation aspect measured for each of the target regions; and
   associating the depth aspect computed for each of the target regions with a corresponding pixel of the 2D image.

2. The method of claim 1, wherein measuring the modulation aspect comprises measuring a phase delay.

3. The method of claim 1, wherein measuring the modulation aspect comprises measuring a pulse delay.

4. The method of claim 1, wherein associating the depth aspect with a corresponding pixel of the 2D image comprises mapping the plurality of target regions to a corresponding plurality of pixels of the 2D image.

5. The method of claim 4, wherein mapping the plurality of target regions to the corresponding plurality of pixels of the 2D image comprises:
   modulating and scanning the illumination beam over a calibration subject to project a calibration pattern on the calibration subject;
   capturing a 2D image of the calibration subject;
   locating one or more features of the calibration pattern in the 2D image to define a 2D mapping function; and
   applying the 2D mapping function to map the plurality of target regions to the corresponding plurality of pixels.

6. The method of claim 5 further comprising measuring a modulation aspect of light reflecting from the calibration subject to define a depth mapping function, wherein computing the depth aspect comprises applying the depth mapping function to the modulation aspect measured for each of the target regions.

7. The method of claim 4, wherein the modulation aspect is measured periodically as the illumination beam scans over the subject, thereby defining a depth-sampling resolution along an axis, wherein the depth-sampling resolution is lower than the resolution of the 2D image along the same axis, and wherein the method further comprises interpolating a depth aspect for a pixel of the 2D image based on two or more depth aspects associated with the corresponding plurality of pixels.

8. The method of claim 1, wherein capturing the 2D image comprises capturing a color image having two or more color-specific brightness values for each pixel.

9. The method of claim 1, wherein the captured 2D image is among a series of captured video frames of the same subject.

10. The method of claim 9, wherein associating the depth aspect with the corresponding pixel of the 2D image comprises averaging a plurality of depth aspects associated with corresponding pixels in the series of captured video frames.

11. A method for constructing a 3D representation of a subject, the representation including brightness and depth information, the method comprising:
   with a moving-mirror beam scanner, modulating and scanning the illumination beam over the calibration subject to project a calibration pattern on a calibration subject;
   with a color camera, capturing a 2D image of the calibration subject;
   locating one or more features of the calibration pattern in the 2D image of the calibration subject to define a 2D mapping function;
   with the color camera, capturing a 2D image of the subject, the 2D image including an array of pixels and at least one brightness value for each pixel;
   with the moving-mirror beam scanner, scanning a modulated illumination beam over the subject to illuminate, one at a time, a plurality of target regions of the subject;
   with a photodetector, measuring a modulation aspect of light from the illumination beam reflected from each of the target regions;
   computing a depth aspect based on the modulation aspect measured for each of the target regions; and
   applying the 2D mapping function to associate the depth aspect computed for each of the target regions with a corresponding pixel of the 2D image.

12. The method of claim 11 further comprising measuring a modulation aspect of light reflecting from the calibration subject to define a depth mapping function, wherein computing the depth aspect comprises applying the depth mapping function to the modulation aspect measured for each of the target regions.

13. A system for constructing a 3D representation of a subject, the representation including brightness and depth information, the system comprising:
   a camera arranged opposite the subject and configured to capture a 2D image of the subject;
   at least one laser arranged to direct light into an illumination beam;
   a controller configured to modulate an intensity of the illumination beam and to receive the 2D image from the camera;
   a mirror coupled to a mount and configured to reflect the illumination beam;
   a transducer operatively coupled to the controller and configured to deflect the mirror so that the modulated illumination beam scans over the subject, illuminating, one at a time, a plurality of target regions of the subject; and
   a first photodetector operatively coupled to the controller and configured to measure a modulation aspect of light from the illumination beam reflected from each of the target regions,
   wherein the controller is further configured to compute a depth aspect based on the modulation aspect measured for each of the target regions, and to associate the depth aspect computed for each of the target regions with a corresponding pixel of the 2D image.

14. The system of claim 13, wherein the first photodetector comprises a photodiode.

15. The system of claim 13 further comprising a pick-off plate arranged between the laser and the mirror and configured to reflect a portion of the illumination beam to a second photodetector, the second photodetector operatively coupled to the controller and configured to measure, for each of the plurality of target regions of the subject, a modulation aspect of light reflecting from the pick-off plate.

16. The system of claim 13 further comprising a filter through which light is admitted to the first photodetector, wherein the filter is configured to transmit light of a wavelength or polarization-state range emitted by the laser and to block light of a wavelength or polarization-state range not emitted by the laser.

17. The system of claim 13, wherein the laser is an infrared-emissive laser.

18. The system of claim 13, wherein the camera is an infrared- and visible-sensitive camera.

19. The system of claim 13, wherein the camera comprises a color-sensitive photodetector array having 800 or more photodetector elements along a first axis and 600 or more photodetector elements along a second axis orthogonal to the first axis.

20. The system of claim 13, wherein the controller is further configured to execute a video-game application, and wherein the 3D representation of the subject is input data for the video-game application.

* * * * *